(No Model.)
G. W. KNAPP.
ATTACHING HANDLES TO SHEET METAL VESSELS.
No. 524,854. Patented Aug. 21, 1894.
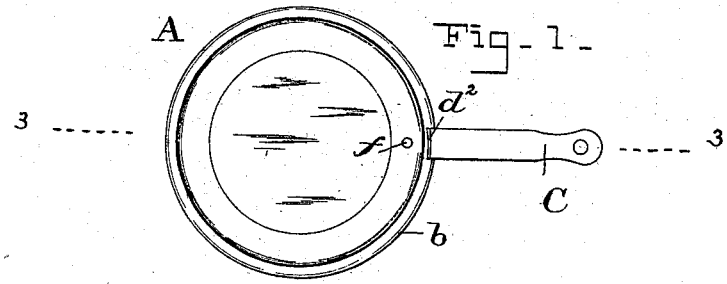
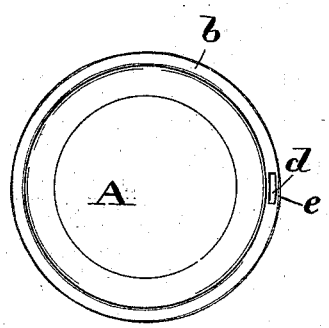
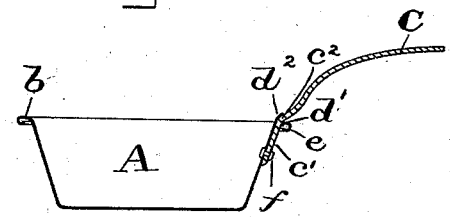
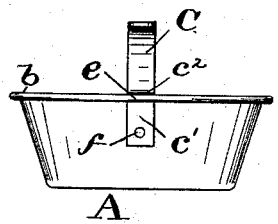
WITNESSES :—
L. J. Van Horn.
Charles B. Mann Jr.
INVENTOR :—
Geo. W. Knapp
By Chas. B. Mann
ATTORNEY.

UNITED STATES PATENT OFFICE.

GEORGE W. KNAPP, OF BALTIMORE, MARYLAND.

ATTACHING HANDLES TO SHEET-METAL VESSELS.

SPECIFICATION forming part of Letters Patent No. 524,854, dated August 21, 1894.

Application filed February 2, 1894. Serial No. 498,826. (No model.)

*To all whom it may concern:*

Be it known that I, GEORGE W. KNAPP, a citizen of the United States, residing at Baltimore, in the State of Maryland, have invented certain new and useful Improvements in Attaching Handles to Sheet-Metal Vessels, of which the following is a specification.

My invention relates to an improvement in attaching handles to sheet-metal vessels of that type in which the top-rim of the vessel-walls has an outward projecting circumferential flange, and the object of the invention is to utilize this flange to assist in holding the handle rigid and secure, as will be hereinafter described.

The invention is illustrated in the accompanying drawings, in which—

Figure 1 is a top view of the sheet-metal vessel with the handle attached. Fig. 2 is a top view of the same with the handle removed. Fig. 3 is a vertical section on the line 3—3. Fig. 4 is a side view of the vessel and handle.

Referring to the drawings, the letter, A, designates the sheet-metal vessel, and, $b$, the outward projecting flange at the top-rim thereof. At the point where it is desired to attach the metal handle, C, the outward flange is slitted lengthwise, as at, $d$; the outer edge, $d'$, of the slit may have a slight down-bend, as in Fig. 3, and the inner edge an upward projecting lip, $d^2$. In this case the metal is cut out or removed in making the slit-opening. Or the slit may be like that shown in Fig. 2, where the opening or slot is formed by cutting out a narrow strip from the rim-flange. In either case, however, the edge, $e$, of the rim is left uncut, and this edge constitutes a back-bar which, when the handle is in position, extends across the back of the handle and with a rivet or solder serves to hold the handle firmly. This slit is to be of approximately the width and thickness of the metal handle.

The lower end, $c'$, of the metal handle is inserted down through the slit and rests against the outer surface of the wall of the vessel and is secured by one or more rivets, $f$, and the back-bar, $e$, of the rim-flange. An outward bent part, $c^2$, of the handle has position between the upturned projecting lip, $d^2$, and the down-bent outer edge, $d'$, of the slit, the said lip and edge act as a clamp to hold said bent part, $c^2$, securely from movement.

It is obvious that the lip, $d^2$, of the rim-flange may be dispensed with and also that the down-bent edge, $d'$, may be straight, if desired, without departing from my invention as hereinafter claimed.

Having thus described my invention, what I claim as new, and desire to secure by Letters Patent, is—

1. The combination of a sheet-metal vessel, A, having at its top an outwardly-projecting rim-flange which is provided with a slit-opening extending parallel with the edge, $e$, of said flange; and a handle having a metal plate-end inserted down through said slit and fitting tightly therein and said end suitably secured against the outer surface of the wall of the vessel,—the said edge, $e$, of the rim-flange constituting a back-bar to sustain the handle.

2. The combination of a sheet-metal vessel, A, having at its top an outwardly-projecting rim-flange which is provided with a slit, $d$, extending parallel with said flange and having a down-bent edge, $d'$, on one side of the slit and an upturned projecting lip, $d^2$, on the other side; and a metal handle having a plate-end, $c'$, inserted down through the said slit and clamped tightly between said down-bent edge and upturned lip, and said plate-end secured to the wall of the vessel.

In testimony whereof I affix my signature in the presence of two witnesses.

GEORGE W. KNAPP.

Witnesses:
    CHAS. B. MANN, Jr.,
    C. CALVERT HINES.